(12) United States Patent
Chan et al.

(10) Patent No.: US 10,127,140 B2
(45) Date of Patent: *Nov. 13, 2018

(54) AUTOMATED PROBLEM DETERMINATION FOR COOPERATING WEB SERVICES USING DEBUGGING TECHNOLOGY

(71) Applicant: International Business Machines Corporation, Armonk, NY (US)

(72) Inventors: Eugene W. Chan, Vaughan (CA); Yingcong Guan, Richmond Hill (CA); John R. MacMillan, Toronto (CA); Ettore Tiotto, Markham (CA); Trong Truong, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,177

(22) Filed: Jun. 16, 2016

(65) Prior Publication Data

US 2017/0270023 A1 Sep. 21, 2017

Related U.S. Application Data

(63) Continuation of application No. 15/074,249, filed on Mar. 18, 2016, now Pat. No. 9,898,384.

(51) Int. Cl.
*G06F 9/44* (2018.01)
*G06F 9/45* (2006.01)
(Continued)

(52) U.S. Cl.
CPC ........ *G06F 11/3644* (2013.01); *G06F 11/362* (2013.01); *H04L 67/02* (2013.01);
(Continued)

(58) Field of Classification Search
CPC ............. G06F 11/3664; G06F 11/3692; G06F 17/3089; G06F 2009/45591; G06F 2221/033; G06F 3/1226
See application file for complete search history.

(56) References Cited

U.S. PATENT DOCUMENTS 7,634,759 B2 * 12/2009 Calsyn .................. G06F 9/4843
717/124
7,665,064 B2 * 2/2010 Able ................. G06F 17/30861
717/117

(Continued)

OTHER PUBLICATIONS

Toyotaro Suzumura et al.; Performance Comparison of Web Service Engines in PHP Java and C; IEEE; pp. 385-392; <https://ieeexplore.ieee.org/stamp/stamp.jsp?tp=&arnumber=4670199> (Year: 2008).*

(Continued)

*Primary Examiner* — Thuy Dao
*Assistant Examiner* — Cuong V Luu
(74) *Attorney, Agent, or Firm* — Gilbert Harmon, Jr.

(57) ABSTRACT

In an approach to problem determination for cooperating web services, a computing device executes a debug script. The computing device discovers one or more web services based on a web service discovery mechanism. The computing device connects, by the debug daemon, with a debug probe to set a breakpoint on a web service. The computing device receives a file containing connection parameters. The computing device initiates a debug session with the web service using a designated connection channel. The computing device invokes a breakpoint handler function for the web service. The computing device sends commands to the debug probe, which forwards the debug commands to the web service. The computing device closes the debug session with the web service when the breakpoint handler function has run to completion.

7 Claims, 4 Drawing Sheets

(51) Int. Cl.
  *G06F 9/445*   (2018.01)
  *G06F 11/36*   (2006.01)
  *H04L 29/08*   (2006.01)

(52) U.S. Cl.
  CPC ............ *H04L 67/141* (2013.01); *H04L 67/28* (2013.01); *H05K 999/99* (2013.01); *G06F 11/3692* (2013.01)

(56) References Cited

U.S. PATENT DOCUMENTS

| | | | |
|---|---|---|---|
| 8,245,198 B2 | 8/2012 | Arkhipov et al. | |
| 8,392,885 B2 | 3/2013 | Stall et al. | |
| 8,752,024 B2* | 6/2014 | Bates | G06F 8/70 717/124 |
| 8,769,502 B2* | 7/2014 | Heidasch | G06F 11/36 717/124 |
| 8,856,736 B2* | 10/2014 | Khare | G06F 8/38 717/109 |
| 8,856,742 B2* | 10/2014 | Branda | G06F 11/3664 717/124 |
| 2004/0230954 A1* | 11/2004 | Dandoy | G06F 11/3644 717/124 |
| 2004/0268315 A1 | 12/2004 | Gouriou et al. | |
| 2005/0216895 A1* | 9/2005 | Tran | G06F 11/362 717/127 |
| 2005/0289396 A1* | 12/2005 | Hooper | G06F 11/3664 714/34 |
| 2006/0129988 A1* | 6/2006 | Calsyn | G06F 9/4843 717/124 |
| 2009/0164981 A1* | 6/2009 | Heidasch | G06F 11/36 717/129 |
| 2011/0191752 A1* | 8/2011 | Cleraux | G06F 9/44 717/129 |
| 2012/0291009 A1* | 11/2012 | Khare | G06F 8/38 717/109 |
| 2012/0317548 A1* | 12/2012 | Olsa | G06F 11/362 717/125 |
| 2013/0086559 A1* | 4/2013 | Bates | G06F 8/70 717/129 |
| 2014/0173565 A1* | 6/2014 | Scholl | G06F 11/3664 717/124 |
| 2014/0215441 A1 | 7/2014 | Thukkaram et al. | |

OTHER PUBLICATIONS

Xiaoying Bai et al.; WSDL-Based Automatic Test Case Generation for Web Services Testing; IEEE; 6 pages; <https://ieeexplore.ieee.org/stamp/stamp.jsp?tp=&arnumber=1551150> (Year: 2005).*

Xiang Fu et al.; Analyzing Conversations of Web Services; IEEE; pp. 18-25; <https://ieeexplore.ieee.org/stamp/stamp.jsp?tp=&arnumber=1580410> (Year: 2006).*

Graham Glass; The Web services (r)evolution Applying Web services to applications; IBM; 5 pages; <http://www.cs.uoi.gr/~pvassil/downloads/WebServices/Tutorials/ws-peer1.pdf> (Year: 2000).*

Meiko Jensen et al.; SOA and Web Services New Technologies, New Standards—New Attacks; IEEE; pp. 35-44; <https://ieeexplore.ieee.org/stamp/stamp.jsp?tp=&arnumber=4399733> (Year: 2007).*

W. T. Tsai et al.; Developing and Assuring Trustworthy Web Services; IEEE; pp. 43-50; <https://ieeexplore.ieee.org/stamp/stamp.jsp?tp=&arnumber=1452016> (Year: 2005).*

Casado et al., "Testing the Reliability of Web Services Transactions in Cooperative Applications", Proceedings of the 2012 ACM Symposium on Applied Computing (SAC 2012), © ACM, 2012, 6 pages.

Mayer et al., "Towards a BPEL unit testing framework", TAV-WEB'06, Jul. 17, 2006, Portland, Maine, USA. Copyright 2006 ACM 1-59593-458-8/07/2006, pp. 33-42.

Chan et al., "Automated Problem Determination for Cooperating Web Services Using Debugging Technology", U.S. Appl. No. 15/074,249, filed Mar. 18, 2016, 33 pages.

IBM Appendix P, list of patents or patent applications treated as related, Jun. 16, 2016, 2 pages.

Siew Poh Lee et al.; Web Services Implementation Methodology for SOA Application; 2006 IEEE; pp. 335-340.

Tien-Dung Cao et al.; WSOTF An Automatic Testing Tool for Web Services Composition; 2010 IEEE; pp. 7-12.

Toyotaro Suzumura et al.; Performance Comparison of Web Service Engines in PHP Java and C; 2008 IEEE; pp. 385-392.

W. T. Tsai et al.; Developing and Assuring Trustworthy Web Services; 2005 IEEE; pp. 43-50.

W.T. Tsai et al.; On Testing and Evaluating Service Oriented Software; 2008 IEEE; pp. 40-46.

Xiaoying Bai et al; WSDL Based Automatic Test Case Generation for Web Services Testing; 2005 IEEE; 6 pages.

* cited by examiner

AUTOMATED PROBLEM DETERMINATION FOR COOPERATING WEB SERVICES USING DEBUGGING TECHNOLOGY

TECHNICAL FIELD OF THE INVENTION

The present disclosure relates generally to the field of software development, and more particularly to debugging in the context of cooperating web services.

BACKGROUND OF THE INVENTION

Cloud applications are increasingly architected as groups of cooperating we services. This trend is accelerated by the industry adoption of microservices architectures, characterized by communication among narrowly focused and independently deployable services. Cooperating web services increase the complexity of problem determination in the context of debugging, or identifying and resolving defects that interfere with the intended operation of computer software or systems.

SUMMARY

According to one embodiment of the present invention, a computer-implemented method for problem determination for cooperating web services is provided. The computer-implemented method comprises: executing, by one or more computer processors, a debug script; discovering, by one or more computer processors, one or more web services based on a web service discovery mechanism; connecting, by one or more computer processors, by a debug daemon, with a debug probe to set a breakpoint on a web service; receiving, by one or more computer processors, a file containing connection parameters; initiating, by one or more computer processors, a debug session with the web service using a designated connection channel; invoking, by one or more computer processors, a breakpoint handler function for the web service; sending, by one or more computer processors, commands to the debug probe, wherein the debug commands are forwarded to the web service; and closing, by one or more computer processors, responsive to the breakpoint handler function having run to completion, the debug session with the web service.

According to another embodiment of the present invention, a computer-implemented method for problem determination for cooperating web services is provided. The computer-implemented method comprises: receiving, by one or more computer processors, one or more breakpoint requests for one or more web services; accessing, by one or more computer processors, a service declaration table; setting, by one or more computer processors, based on language adapters, one or more breakpoints on one or more entry points; receiving, by one or more computer processors, a notification that a breakpoint has been hit; connecting, by one or more computer processors, to a debug daemon on a client device; sending, by one or more computer processors, to the client device, a file containing connection parameters; and initiating, by one or more computer processors, a debug session with a web service using a designated connection channel.

DETAILED DESCRIPTION

One of the major difficulties posed by the architecting of cloud applications as groups of cooperating web services is the increasing complexity of problem determination, which poses challenges for traditional interactive debugging approaches. Application logging is the dominant problem determination technique in this context, but it has a number of drawbacks:

(1) The process is very time consuming;
(2) It is difficult to cross-correlate a set of logs;
(3) The logs may contain inadequate information or be missing information;
(4) There may be limited contextual data in the logs, despite their relevance;
(5) The cause-and-effect relationship between recorded events in the logs may not be immediately obvious; and
(6) Log information may be lost due to insufficient storage capacity or insufficient access to bandwidth.

The present disclosure proposes a framework for automated targeted problem determination for cooperating web services. The present approach allows for targeted execution of a debug script upon specific conditions that span multiple web services.

Figure 1:
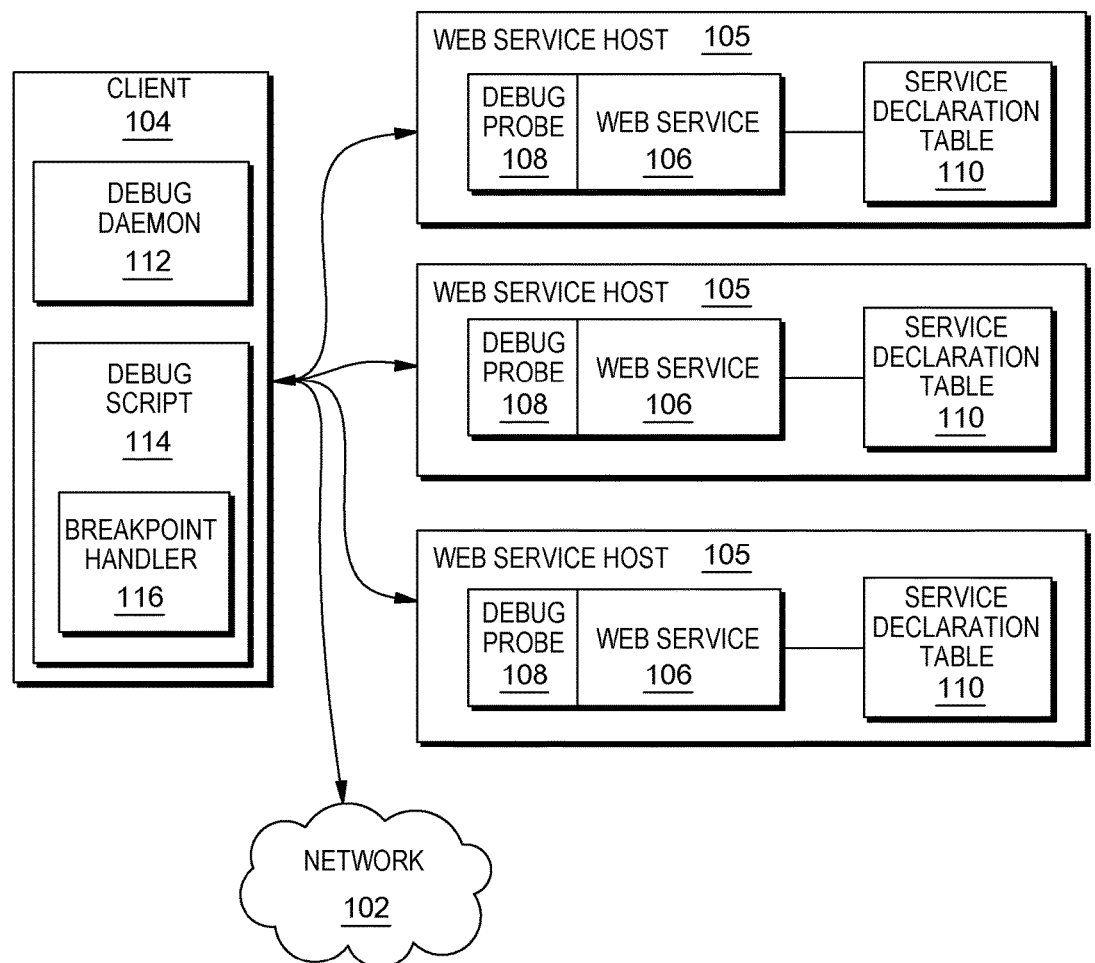
FIG. 1 is a functional block diagram of an exemplary computing environment, in accordance with an embodiment of the present invention.

Embodiments of the present invention are described herein with reference to the Figures. FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 can be, for example but without limitation, a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud computing environment can include one or more cloud computing nodes that may be grouped in one or more networks, such as Private, Community, Public, or Hybrid, or a combination thereof (not shown). It should be noted that implementation of the teachings recited herein is not limited to a cloud computing environment. Rather, embodiments of the present invention are capable of being implemented in conjunction with any other type of computing environment now known or later developed.

Computing environment 100 includes client 104 and instances of web service host 105, interconnected over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between client 104 and other computing devices (not shown) within computing environment 100, in accordance with an embodiment of the present invention.

Client 104 is a central control that orchestrates problem determination for a variable number of web services, hosted by instances of web service host 105, by executing a debug script. Client 104 includes debug daemon 112 and debug script 114 (each described herein).

Web service host 105 includes one or more instances of web service 106, an instance of debug probe 108, and an instance of service declaration table 110 (each described herein). The instances of web service host 105 shown in FIG. 1 are representative of a variable number of web service hosts, and the number of instances shown is not intended to be limiting.

Web service 106 is one of a variable number of cooperating web services interconnected over network 102. One or more instances of web service 106, i.e., one or more web services, can be hosted on a single instance of web service host 105.

Debug probe 108 is a lightweight debugger that runs on web service host 105 and allows client 104 to control web service 106. Debug probe 108 is responsible for setting breakpoints, initiating debugging, and dispatching debug commands for web service 106, as described herein. A breakpoint is an instruction to stop execution of a program at a specified location. Debugging occurs when a breakpoint is "hit," i.e., when a breakpoint event (also referred to herein as a "breakpoint hit event") occurs.

After a breakpoint is hit, debug probe 108 initiates a connection with client 104 in order to establish a debug session. If client 104 is not available to intercept debug connections, debug probe 108 ignores the breakpoint and allows web service 106 to continue to run without interruption. After debug probe 108 establishes a connection between client 104 and web service host 105, instructions inside breakpoint handler 116 (described herein) are executed.

Service declaration table 110 is a table maintained on web service host 105. Service declaration table 110 associates web service 106 with identifying information such as but not limited to a name, a type, and an entry point. In an exemplary embodiment, service declaration table 110 can be a section in a configuration file that appears as a physical file on a host file system.

Debug daemon 112 is a program that runs on client 104 as a background process and waits, e.g., listens, for incoming debug connections from debug probe 108.

Debug script 114 is a single debug script, for example a Python script backed by the Jython processor and a debug extension library, that executes on client 104 and is capable of communicating with web service 106, setting a list of breakpoints on web service 106, and handling breakpoint events that occur within web service 106.

When setting breakpoints, debug script 114 does not need to refer to details beyond a name of web service 106, such as, e.g., where web service 106 is located and the concrete implementation of web service 106. Additional details, e.g., which instance of web service host 105 hosts web service 106, can be handled by a web service discovery mechanism. A web service discovery mechanism can be, for example, one of the web service discovery tools that are well known in the art, such as but not limited to Universal Description Discovery and Integration (UDDI).

Debug script 114 supports an event handler (also referred to as a "breakpoint handler" or "breakpoint handler function"), i.e., breakpoint handler 116. In debug script 114, an instance of breakpoint handler 116 is associated with each breakpoint set on an instance of web service 106, and is invoked when the associated breakpoint is hit. When debug script 114 invokes breakpoint handler 116, context information is available to breakpoint handler 116 as function parameters.

Figure 2:
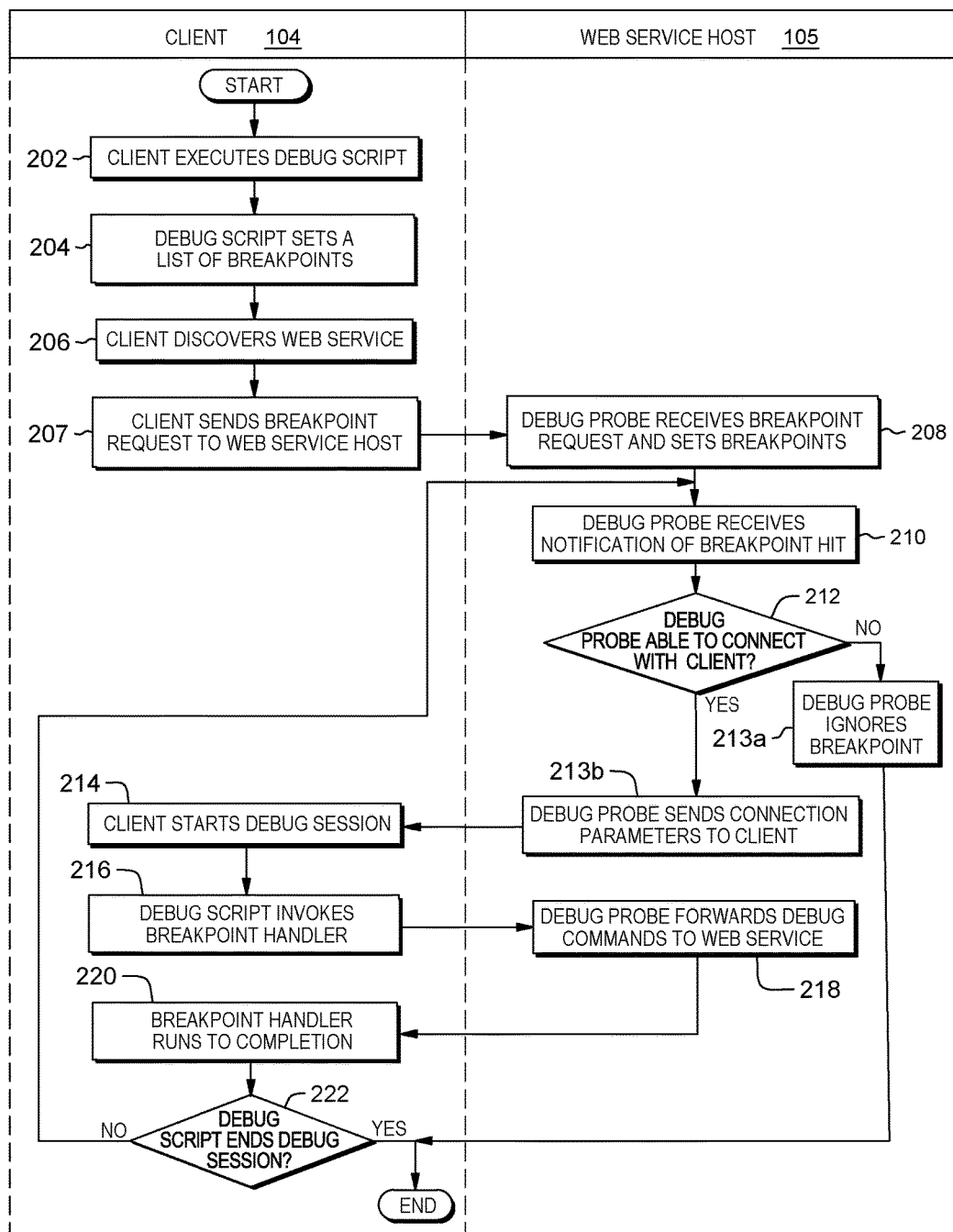
FIG. 2 is a flowchart depicting steps of a method for problem determination for cooperating web services, in accordance with an embodiment of the present invention.

FIG. 2 is a flowchart 200 depicting operational steps of a method for problem determination for cooperating web services, in accordance with an embodiment of the present invention.

In step 202, client 104 executes debug script 114.

In step 204, debug script 114 sets a list of breakpoints on known web services, e.g., one or more instances of web service 106, without referring to a location of web service 106. It should be noted that step 204 comprises a client-side breakpoint request, based on a line in debug script 114; this is in contrast with the breakpoint request described herein with respect to step 208, which occurs on web service host 105, responsive to transfer of one or more breakpoint requests to web service host 105.

In step 206, client 104 discovers the location of web service 106 in computing environment 100 using a web service discovery mechanism.

In step 207, after having determined the location of web service 106 in step 206, client 104 connects, by debug daemon 112, with debug probe 108 and sends the breakpoint request(s) to the instance of web service host 105 that hosts web service 106.

In step 208, debug probe 108 receives the breakpoint request(s) sent by client 104. Debug probe 108 accesses service declaration table 110 to determine the implementation details of web service 106, e.g., the implementation language of web service 106, such as but without limitation Java or node.js. Debug probe 108 uses appropriate language adapters to set one or more breakpoints on the correct entry points. For example, because instances of web service 106 can be implemented in different languages (e.g., Java, node.js), and low-level operations required to set a breakpoint differ between languages, debug probe 108 uses language adapters to set low-level breakpoints that correspond to the implementation language of web service 106.

In step 210, debug probe 108 receives a notification that a breakpoint on web service 106 has been hit.

In step 212, debug probe 108 attempts to connect with debug daemon 112 on client 104 in order to start a debug session.

In step 213a, if debug probe 108 is unable to connect with client 104, debug probe 108 ignores the breakpoint and allows web service 106 to continue to run.

In step 213b, if debug probe 108 is able to connect with client 104, debug probe 108 sends a file, for example but without limitation a configuration XML file, that contains connection parameters to client 104. Connection parameters can be, for example but without limitation, a host name, a port number for debug probe 108, a source file and line number for the breakpoint, and an implementation language of the source.

In step 214, after receiving the file containing connection parameters, client 104 starts a debug session on web service 106 using the connection channel between debug daemon 112 on client 104 and debug probe 108 on web service host 105. Client 104 uses the connection parameters sent in step 213b to initialize the debug session, so that the debug session stops at the correct entry point for the breakpoint that was hit.

In step 216, debug script 114 invokes breakpoint handler 116 for web service 106. Statements inside breakpoint handler 116 are executed and debug commands are sent to debug probe 108 using the connection channel.

In step 218, debug probe 108 acts as a proxy after a live debug connection is established between web service host 105 and client 104. Debug probe 108 receives debug commands from client 104 and forwards them to web service 106.

In step 220, breakpoint handler 116 runs to completion. For example, all instructions inside breakpoint handler 116 are executed.

Steps 210-220 can repeat with respect to multiple breakpoint hit notifications for web service 106.

In step 222, debug script 114 determines whether to end the debug session based on one or more defined conditions, for example but without limitation the occurrence of a special debug event or the triggering of a timer. If debug script 114 determines that the one or more conditions are met (step 222, YES branch), debug script 114 stops the debug session. If debug script 114 does not determine that the one or more conditions are met (step 222, NO branch), debug script 114 waits for another breakpoint hit event to occur (i.e., triggering repetition to steps 210-220 with respect to the new breakpoint hit event).

If a live debug connection is not desired at all times, for example if maintaining a live connection is deemed to pose cost or security concerns, the connection between client 104 and web service host 105 is closed.

Figure 3:
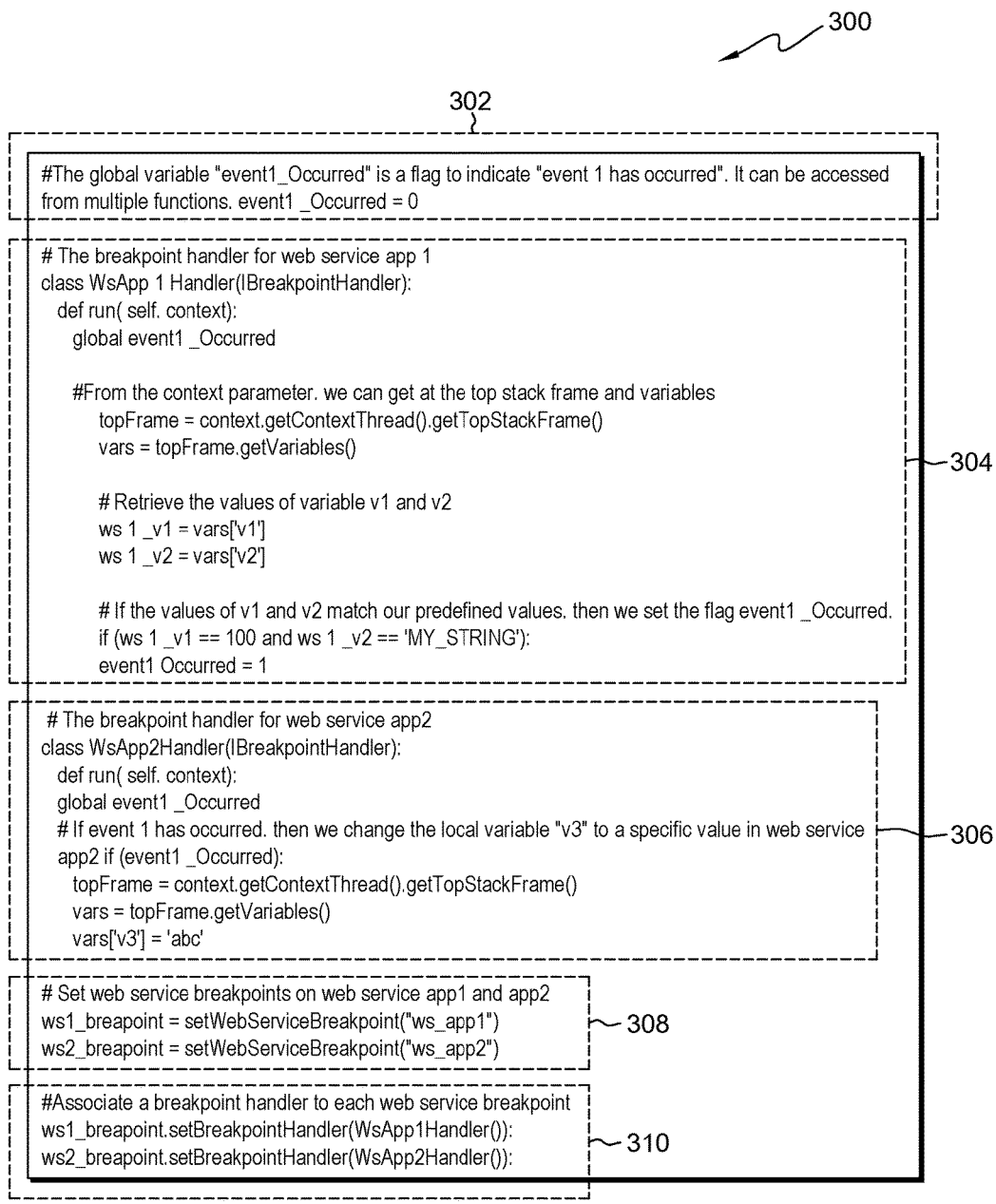
FIG. 3 shows an exemplary debug script, in accordance with an embodiment of the present invention.

FIG. 3 shows an example of a debug script (e.g., debug script 114), in accordance with an embodiment of the present invention.

Global variable 302 is a flag to indicate that "event 1," e.g., a designated breakpoint event, has occurred. Global variable 302 can be accessed from the entire script body.

Breakpoint handler function 304 is a breakpoint handler function, e.g., an instance of breakpoint handler 116, for web service app1, e.g., an instance of web service 106.

Breakpoint handler function 306 is a breakpoint handler function, e.g., an instance of breakpoint handler 116, for web service app2, e.g., another instance of web service 106.

Lines 308 set breakpoints on web service app1 and web service app2, i.e., instances of web service 106.

Lines 310 associate breakpoint handler functions with web service app1 and web service app2, respectively; i.e., associate instances of breakpoint handler 116 with respective instances of web service 106.

Figure 4:
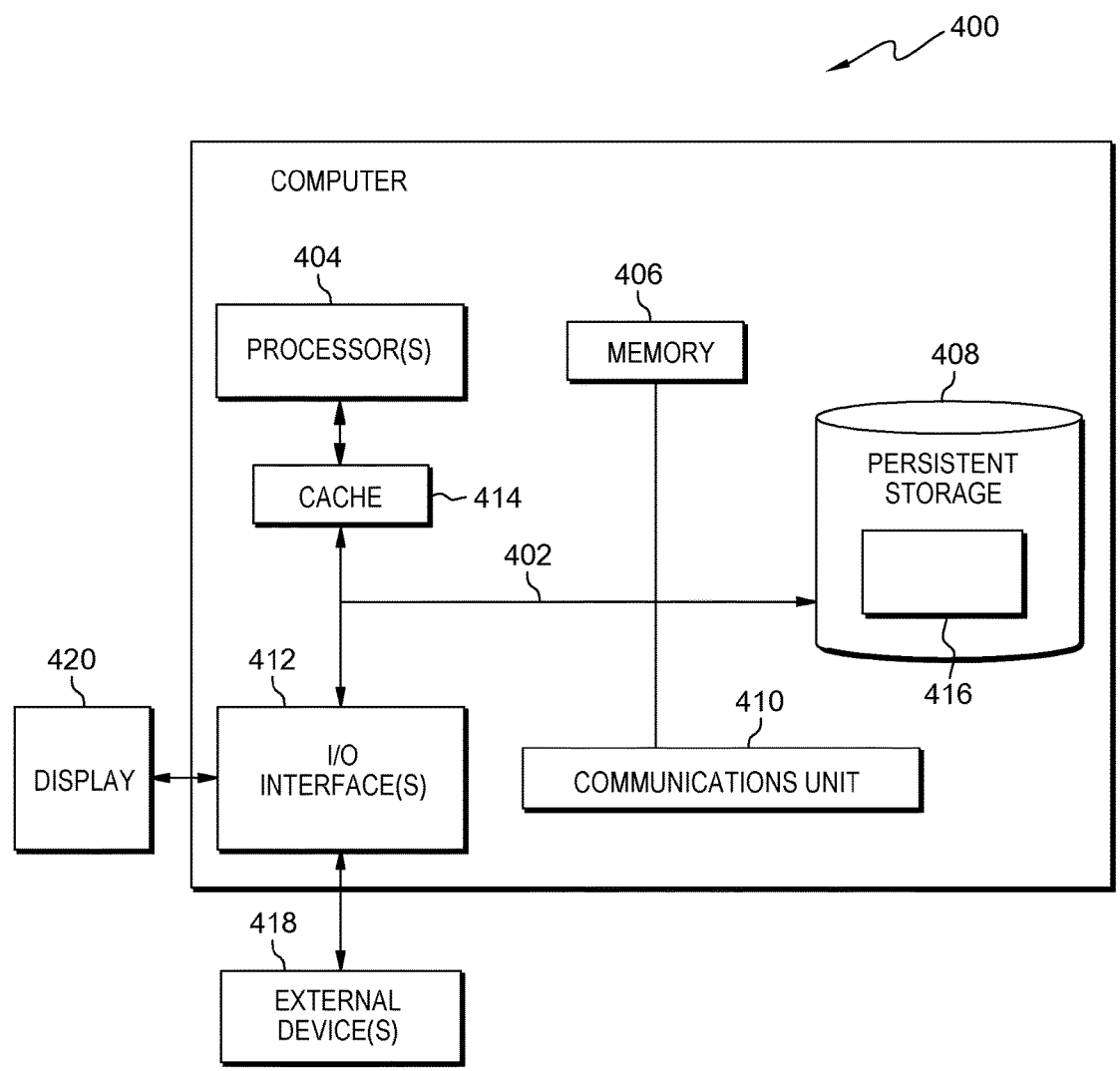
FIG. 4 is a block diagram of components of the computing device in FIG. 1 executing a program for problem determination for cooperating web services, in accordance with an embodiment of the present invention.

FIG. 4 depicts a block diagram 400 of components of a computing device, e.g., client 104 in computing environment 100, in accordance with illustrative embodiments of the present invention. It should be appreciated that FIG. 4 provides only an illustration of one implementation and does not imply any limitations with regard to the environments in which different embodiments may be implemented. Many modifications to the depicted environment may be made.

Client 104 includes communications fabric 402, which provides communications between computer processor(s) 404, memory 406, persistent storage 408, communications unit 410, and input/output (I/O) interface(s) 412, and cache 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) and cache memory 414. In general, memory 406 can include any suitable volatile or non-volatile computer readable storage media. Cache 414 is a fast memory that enhances the performance of computer processor(s) 404 by holding recently accessed data, and data near accessed data, from memory 406.

Program instructions and data used to practice embodiments of the invention, referred to collectively as component(s) 416, are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. Communications unit 410 can include one or more network interface cards. Communications unit 410 can provide communications through the use of either or both physical and wireless communications links. Component(s) 416 can be downloaded to persistent storage 408 through communications unit 410.

I/O interface(s) 412 allows for input and output of data with other devices that may be connected to client 104. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., component(s) 416, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for problem determination for cooperating web services, the method comprising:
   executing, by one or more computer processors, a debug script wherein the debug script sets a list of breakpoints on a list of known web services;
   discovering, by the one or more computer processors, a plurality of web services based on a web service discovery mechanism;
   connecting, by the one or more computer processors, by a debug daemon, with a first debug probe to set a breakpoint on a first web service;
   receiving, by the one or more computer processors, a file containing connection parameters wherein the connection parameters are used to initiate a debug session with the first web service using a designated connection channel;
   invoking, by the one or more computer processors, a breakpoint handler function for the first web service;
   sending, by the one or more computer processors, commands to a second debug probe, wherein the commands are forwarded to a second web service based on the breakpoint; and
   closing, by the one or more computer processors, responsive to the breakpoint handler function having run to completion, the debug session with the second web service.

2. The computer-implemented method of claim 1, further comprising:
   providing, by the one or more computer processors, the debug daemon, wherein the debug daemon listens for a debug connection.

3. The computer-implemented method of claim 2, wherein the one or more web services have names, wherein the debug script knows the names of the one or more web services, and wherein additional details concerning the one or more web services are handled by the web service discovery mechanism.

4. The computer-implemented method of claim 2, wherein each breakpoint is associated with a breakpoint handler function which is invoked when the associated breakpoint is hit.

5. The computer-implemented method of claim 1, wherein the first debug probe sets the breakpoint based on accessing a service declaration table and using language adapters to set the breakpoint on a correct entry point.

6. The computer-implemented method of claim 4, wherein context information is available to the invoked breakpoint handler function as function parameters.

7. The computer-implemented method of claim 1, wherein the first debug probe and the second debug probe act as proxies after a debug connection has been established between a client and a host of the first web service and the second web service, respectively.

* * * * *